Figure 2:
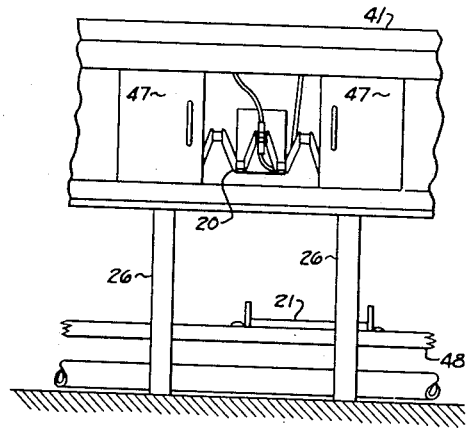

May 30, 1944.　　F. S. DENNEEN ET AL　　2,349,813
APPARATUS FOR SURFACE HARDENING SHAFTS AND THE LIKE
Filed Sept. 4, 1941　　7 Sheets-Sheet 1

INVENTORS.
Francis S. Denneen
William C. Dunn

May 30, 1944. F. S. DENNEEN ET AL 2,349,813
APPARATUS FOR SURFACE HARDENING SHAFTS AND THE LIKE
Filed Sept. 4, 1941 7 Sheets-Sheet 2

INVENTORS
Francis S. Denneen
William C. Dunn

May 30, 1944.  F. S. DENNEEN ET AL  2,349,813
APPARATUS FOR SURFACE HARDENING SHAFTS AND THE LIKE
Filed Sept. 4, 1941  7 Sheets-Sheet 3

INVENTORS.
Francis S. Denneen
William C. Dunn

Patented May 30, 1944

2,349,813

UNITED STATES PATENT OFFICE 2,349,813

APPARATUS FOR SURFACE HARDENING SHAFTS AND THE LIKE

Francis S. Denneen, Cleveland, and William C. Dunn, Shaker Heights, Ohio, assignors to The Ohio Crankshaft Company, Cleveland, Ohio, a corporation of Ohio Application September 4, 1941, Serial No. 409,486

12 Claims. (Cl. 219—13)

The present application relating as indicated to apparatus for heat treating metallic articles by inductive heating usually, but not always followed by cooling, is a continuation in part of our copending application Serial No. 166,648, for Apparatus and method for surface hardening shafts and the like, filed September 30, 1937 and describes an improvement in the subject matter of our invention shown and described in co-pending application Serial No. 56,870 for Apparatus for zone hardening and product thereof filed December 31, 1935 now Patent No. 2,293,047, dated August 18, 1942. The invention disclosed in this last named application provides for means to automatically connect and disconnect in proper sequence certain parts of the apparatus required to accomplish the hardening of a surface zone on a metallic article such as, for instance, the crankshaft shown therein. In our co-pending application Serial No. 383,966 for Apparatus for heat treating, filed March 18, 1941, now Patent No. 2,315,509, dated April 6, 1943, we have shown and claimed the transformer and related heating apparatus shown principally in Figs. 1, 2 and 3 of the present application.

Pieces differing as to material, form or dimensions require different control of the heating and quenching, and further they respond differently in the matter of changes in magnetic qualities, conductivity and other characteristics as the temperature rises.

It will therefore be obvious that such apparatus arranged to properly harden a surface zone on one particular journal may not properly control the heating and quenching for satisfactorily hardening the surface zone and controlling the metallurgical qualities of the zone, affected on a journal of different style, dimensions or material.

Industrial conditions require not only a close duplication of parts, but also require a rapid rate of production. These requirements make necessary a close control of the heating and quenching for each individual surface zone and a rapid transfer from the heating and quenching of one surface zone to another and different closely controlled heating and quenching for another surface zone in order that several such surface zones may be hardened in rapid succession. Such control of heating and quenching and the rapid sequence of heating and quenching periods not only insure a more rapid rate of production from a given set of heating and quenching equipment, but make possible a more efficient use of the generator supplying the heating current by keeping this generator under load a greater part of the time, and save a great deal in original cost by eliminating the necessity of duplicate generators and other equipment.

To accomplish the above desired results, it has been necessary to develop new auxiliary control mechanism not shown in the former application, above identified, and preferably arranged to function in connection with more than one heat treating station.

The principal object of this invention, therefore, is to provide such mechanism as is required to accomplish the desired metallurgy including the hardening of various surfaces in rapid succession. Another object is to provide means for electrically interconnecting such mechanism so that only one power unit is required for several heat treating stations. An additional object is to provide means whereby one hardening operation may be accomplished without interfering with another such operation on another article to be hardened. A further object is to provide means whereby additional heating stations functioning in connection with a general supply source may be easily accomplished. Another object is to provide equipment which can be operated by unskilled persons. An additional object is to provide contact means for transmitting current of high density. A further object is to provide means for tempering the hardened surface zone. Still another object is to provide a method for accurately controlling heating and quenching of any individual article. Another object is to provide means whereby the metallurgy including the hardening of the zone affected may be controlled. Other objects of this invention are: (a) to provide controlled means for hardening a zone on an article by heating and quenching; (b) to provide controlled means for annealing certain classes of materials such as copper, brass and other non-ferrous metals by heating and quenching; (c) to provide means for hardening by heating and quenching and for subsequent tempering by controlled residual heat resulting from the hardening operations; (d) to provide means for heat treating by heating and quenching and controlled re-heating; (e) to provide means for heat treating by pre-heating so as to control the temperature and/or the form and dimensions of a heated zone and for subsequently heating and quenching a portion of such pre-heated zone; (f) to provide means for annealing or tempering by controlled heating and subsequent cooling without the application of a quenching fluid.

With these and other objects in view which will appear as the following description proceeds, said invention then consists of the apparatus illustrated in the annexed drawings and herein described together with the steps to be taken in its use. The phraseology employed is for the purpose of explanation and not for limitation, the claims hereto appended pointing out those parts of the invention which are regarded as novel.

Figure 1:
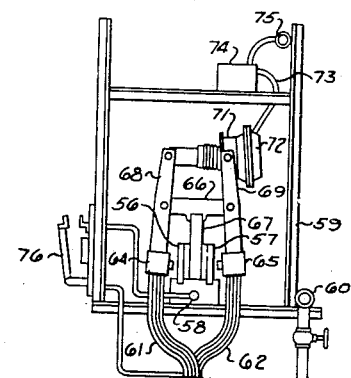
Figure 3:
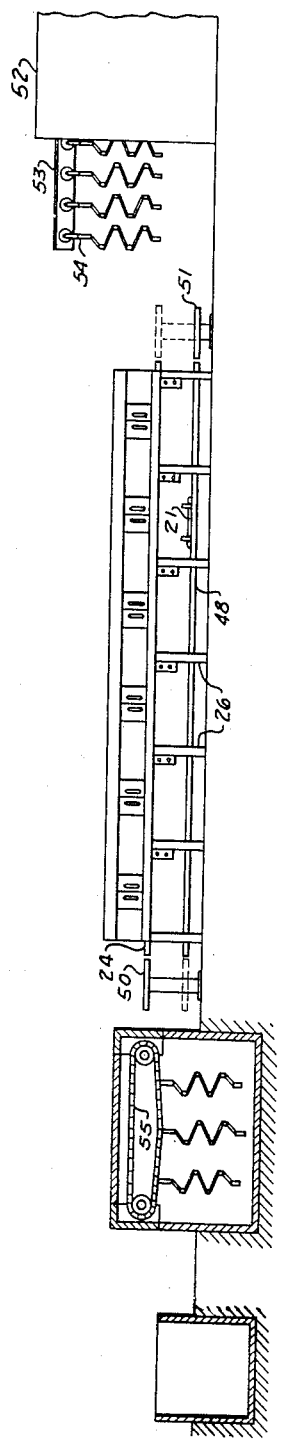
Figure 4:
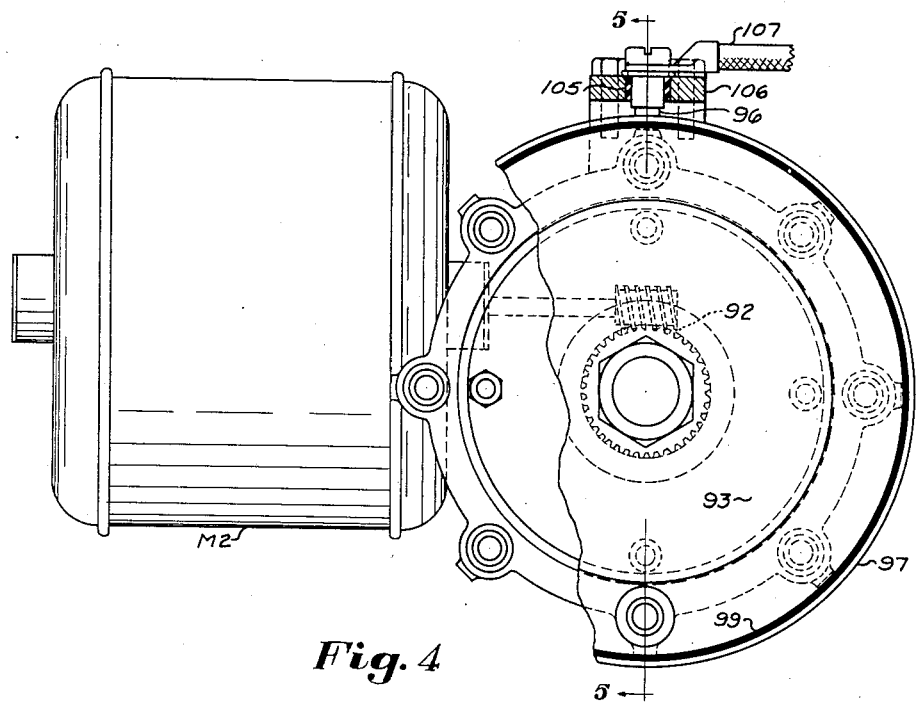
Figure 5:
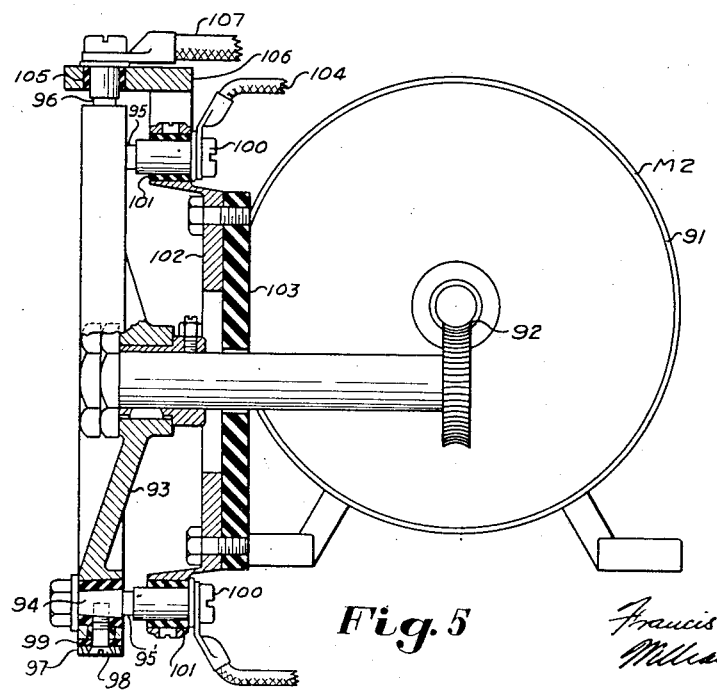
Figure 6:
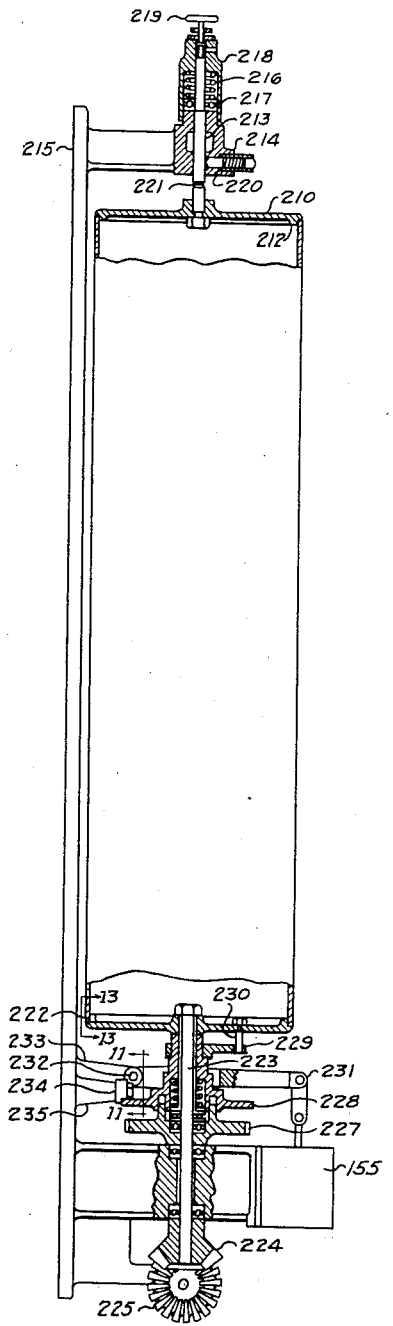
Figure 7:
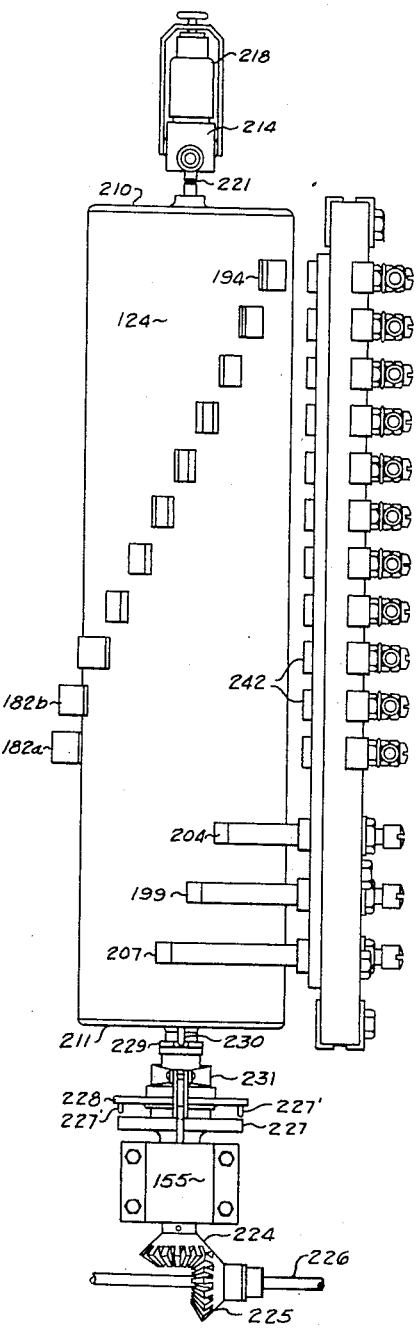
Figure 8:
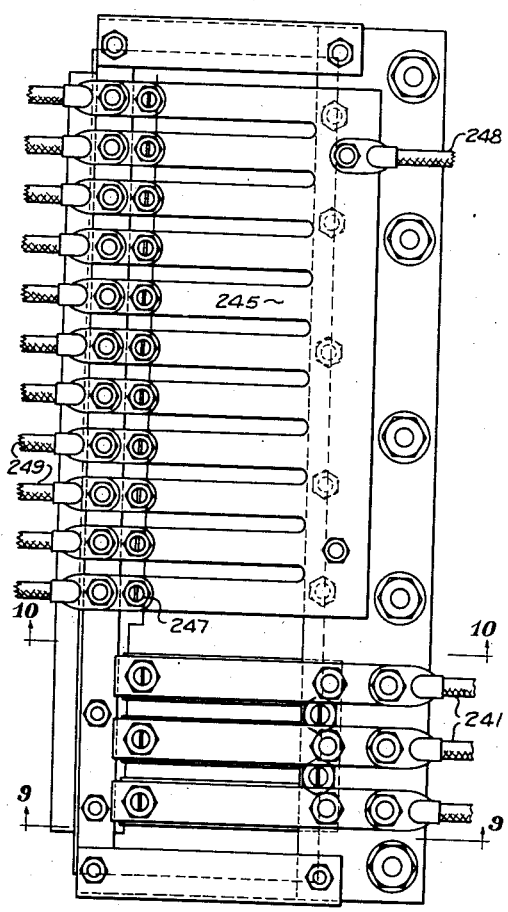
Figure 10:
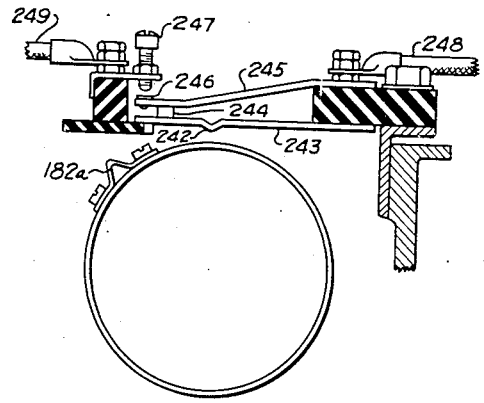
Figure 11:
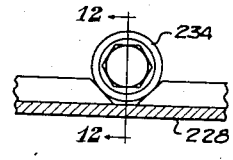
Figure 12:
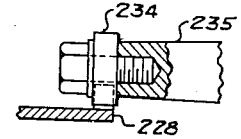
Figure 9:
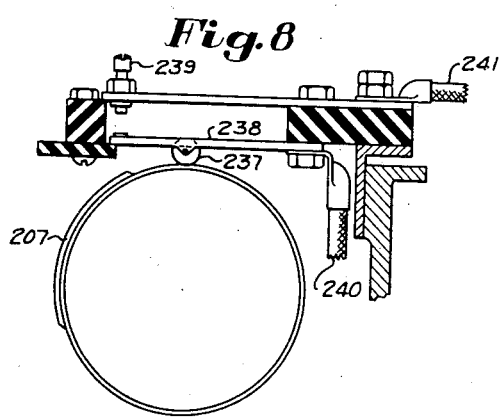
Figure 13:
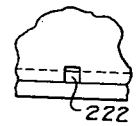
Figure 14A:
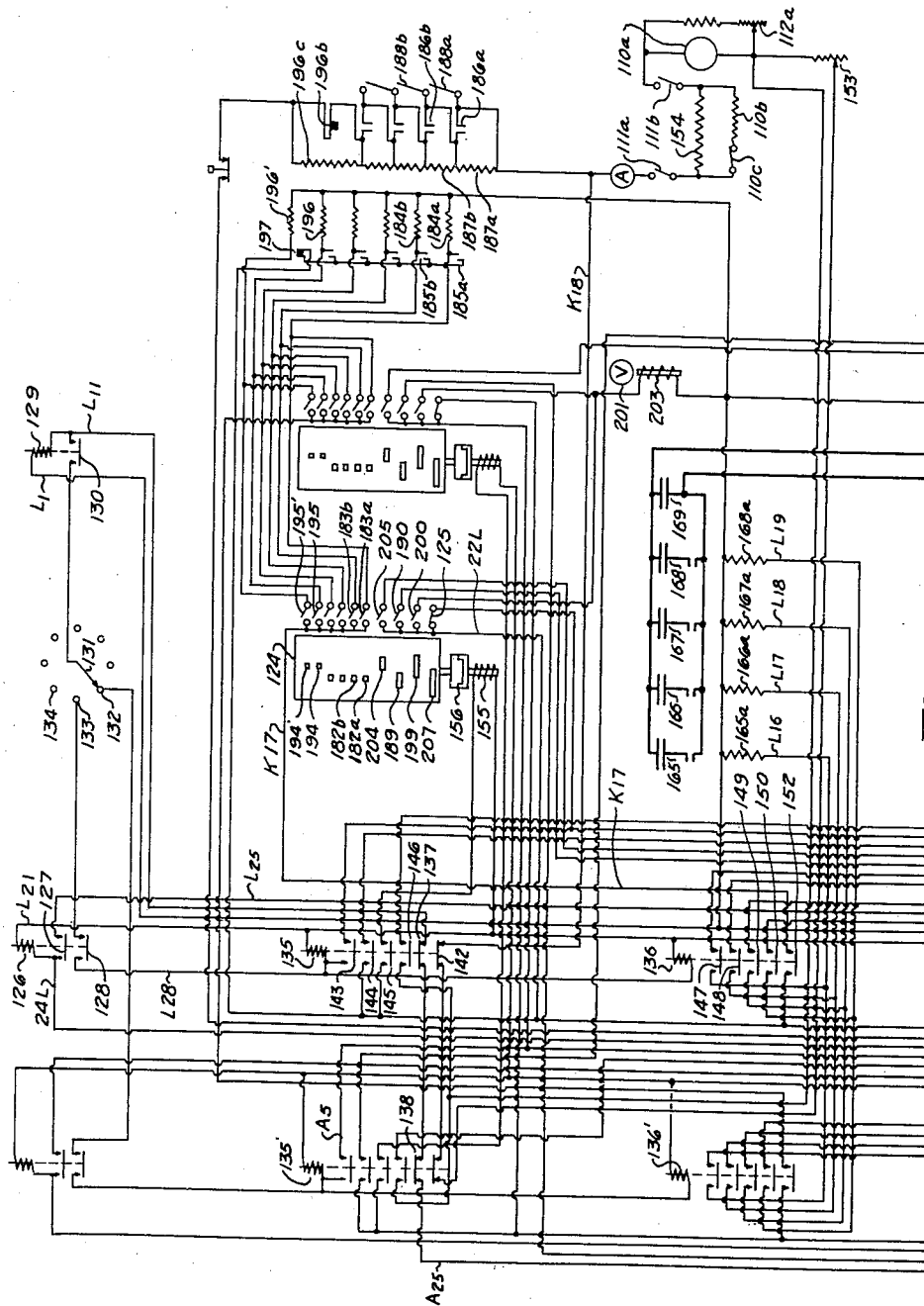
Figure 14B:
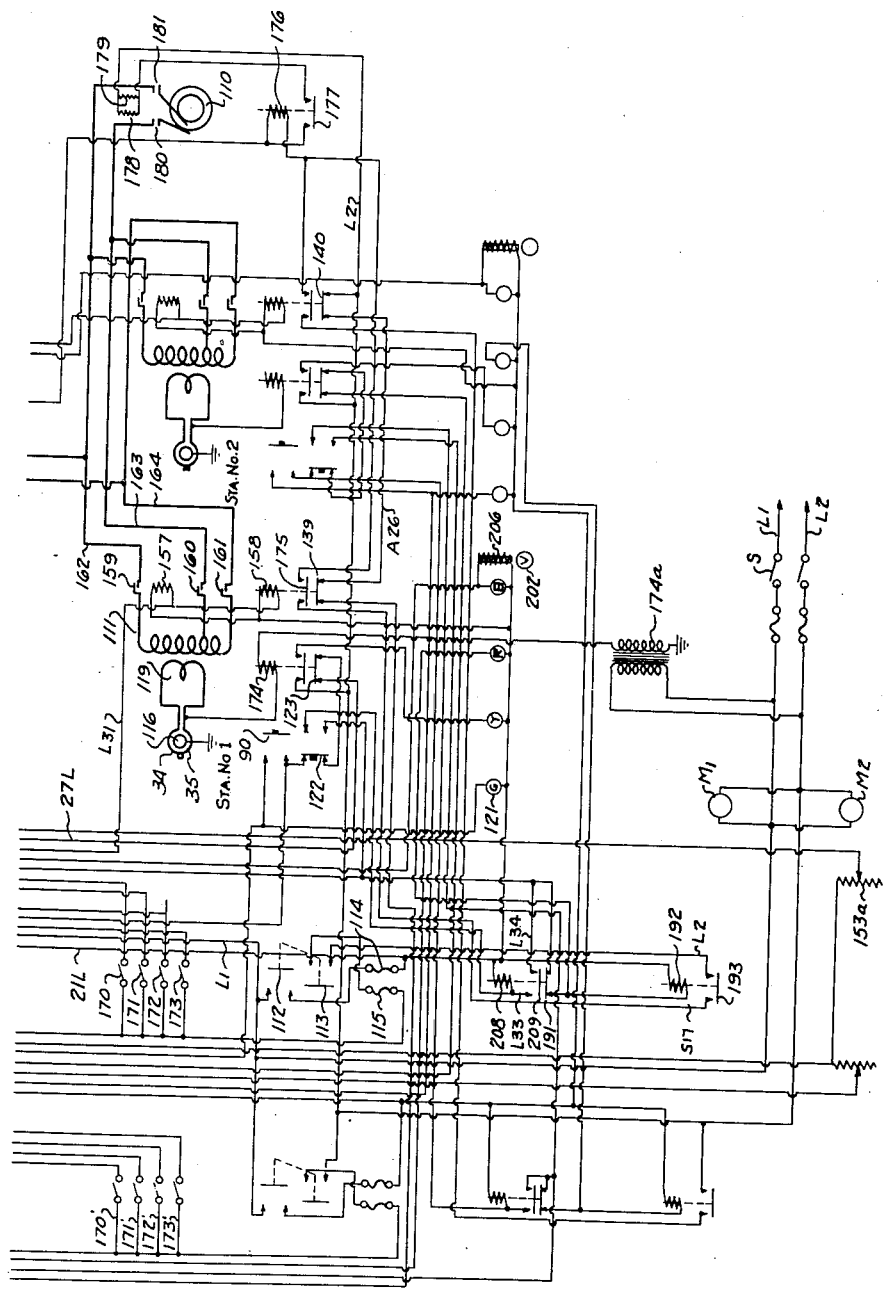

In said annexed drawings:

Fig. 1 is a transverse elevation, partly in section of one form of the heating and quenching mechanism. Fig. 2 is a fragmentary side elevation of a part of said heating and quenching mechanism substantially as indicated at 2—2 in Fig. 1. Fig. 3 is a diagrammatic side elevation, partly in section, illustrating the progressive steps in the heat treatment of a crankshaft. Fig. 4 is a longitudinal elevation, partly in section, showing the motor driven selector employed in the operation of our apparatus. Fig. 5 is a section, substantially on line 5—5 of Fig. 4. Fig. 6 is a side elevation, partly in section, showing the timing drum and drive employed therefor. Fig. 7 is a front elevation of the timing drum and drive showing the contactor element assembly employed therewith. Fig. 8 is an elevation of the contactor element assembly. Fig. 9 is a fragmentary section of the contactor element assembly taken on line 9—9 of Fig. 8. Fig. 10 is a section substantially at 10—10 of Fig. 8. Fig. 11 is a fragmentary section as indicated at 11—11 of Fig. 6. Fig. 12 is a fragmentary section on 12—12 of Fig. 11. Fig. 13 is a view as indicated at 13—13 of Fig. 6. Figs. 14a and 14b when mated together form a diagram of the electrical connections for both the control and power circuits for two heat treating stations.

*Description of heat treating tunnel*

Referring now to the general arrangement of the apparatus illustrated, principally in Figs. 1, 2 and 3, it will be noted that this is indicated as applied to the heat treatment of a crankshaft shown at 20 although numerous other shafts and similar articles may be treated thereby. In this embodiment the carrier 21, having V block supports 22 for the shaft, is carried on wheels 23 which run on tracks 24 and 25. These tracks are supported on a series of frames or supports 26 having such brackets as 27 attached thereto for holding a transformer 28 hereinafter designated as a focus inductor, a frame member of which has a trunnion support at 29 in the frame 30 of a carriage 31. This carriage 31 is provided with four wheels 32 constrained to follow track members such as 33. By means of the trunnion 29 and the wheels 32 the focus inductor is provided with a substantially universal mounting which permits this focus inductor to be moved forward to bring the cylindrical portions of inductor blocks 34 and 35 into correct transverse position relative to a shaft carried by the V block support 22 and permits it to be inclined to meet substantially any elevation of this shaft or any part of the shaft, such as a crank pin, when the V blocks support the main bearings. It also permits the lower block 35 to be lowered sufficiently to be brought under a pin or bearing to be hardened. To facilitate the manual operation of this focus inductor, a changeable counterweight as shown at 36 is provided which balances the greater part of the weight of the inductor blocks 34 and 35. The counterweight is made changeable to balance the focus inductor when this focus inductor is equipped with inductor blocks of different size and weight.

Water for cooling the coils of the focus inductor is provided by flexible hose lines 37 and 38. Quenching fluid, which is usually water or an aqueous solution, is supplied directly to inductors 34 and 35 by hose lines 39 and 40. As there is considerable excess quenching fluid which flows out of the inductors due to the pressure employed, a large part of this, if uncontrolled, would be thrown onto the surrounding mechanism including parts of the focus inductor, damaging this mechanism as well as being lost or wasted. To prevent this damage and loss due to the spraying or scattering of the quenching fluid, an enclosure 41 usually in the form of a tunnel extending past several heater stations at each of which a focus inductor is located, is provided. A flexible boot or bellows shaped shield 42, usually made of canvas, extends from the focus inductor to the tunnel and surrounds the extending parts of the inductors. This shield 42 is sufficiently flexible to permit of the necessary universal movement of this focus inductor. A collector pan 43, usually forming a part of the support stand 26, serves as means for accumulating the spent quenching fluid. Pipe 44 collects the quench from the several pans and returns it to the supply reservoir. A pressure pump, not shown, circulates the quenching fluid through pipe 45 at relatively low pressure until quenching is required, when bypass valve 46 is closed, shutting off the return to the reservoir, and diverting the entire delivery to the lines 39 and 40 which, being somewhat restricted due to the size of orifices in the inductor blocks 34 and 35, causes the pressure at these orifices and in lines 39 and 40 to rise rapidly to a relatively high amount causing the quench to be delivered through the orifices to accomplish the desired rapid quenching of these surfaces with sufficient pressure to dislodge and/or prevent incipient steam pockets or vesicles of vapors on the heated surfaces. For convenient accessibility in placing inductor blocks 34 and 35 in position over the article to be hardened, the tunnel 41 is provided with a door 47 or a pair of doors opposite each heat treating station or focus inductor which doors are easily opened and closed by the operator.

As the shaft to be hardened advances through the tunnel 41 on carrier 21, it is stopped at each station which is equipped with a set of inductors of suitable width and diameter to harden some selected surface on this shaft.

After passing the last station at the end of the tunnel, the shaft is removed from the carrier 21 and this carrier is returned to the opposite end of the tunnel where another shaft to be hardened is placed upon it. In order to bring the carrier back to the starting end of the tunnel, return tracks 48 and 49 are provided in the lower part of the tunnel supporting frames 26, which tracks are spaced substantially the same as tracks 24 and 25 above. A suitable conveyor such as a motor driven chain having link parts to engage the carriers, is ordinarily employed to return the carriers along these lower tracks.

As the carriers 21 have considerable weight, especially when loaded, means is provided for raising and lowering them between the levels of the two sets of tracks. This means comprises the two elevating platforms 50 and 51, one at each end of the tunnel, as shown in Fig. 3, and each of which is fluid operated, usually by compressed air. When the carrier 21 reaches the end of the tunnel it is run out onto platform 50 which is ordinarily provided with a section of track of the same rail spacing as that in the tunnel and with a suitable stop to bring the carrier to rest in a central position thereon. By means of a suitable valve this platform is permitted to descend to a lower limited position as indicated by broken lines in which its elevation is such as to correspond with that of tracks 48 and 49. The carrier is then started on its return trip by means of a conveyor chain to the starting end of the tunnel where it passes onto platform 51. Platform 51 is provided with short sections of track substantially like those on platform 50 and with a corresponding stop. After placing a shaft on the carrier while this carrier is on platform 51, this platform is elevated by fluid pressure controlled by a suitable valve to bring it to a stop at the elevation of the upper tracks 24 and 25 as indicated in broken lines where it is ready to start its return trip past the various heater stations.

In some cases the shaft to be hardened is preheated and is delivered to platform 51 from preheater 52 which is equipped with a track 53 having suitable roller carriers 54. The pre-heater 52 is heated by gas or any other convenient means and the temperature to which the shaft is raised is governed by the shaft and its material. This preheating is to reduce the temperature gradient between the core of the shaft and the surface when heated by induced currents. For instance, the preheating temperature in the case of a crankshaft made from chrome molybdenum steel is set at approximately 300° F.

Upon removing the shaft from the carrier after this carrier has reached platform 50 the shaft is attached to a suitable conveyor such as is indicated at 55 and is caused to pass through a reheating chamber or bath of oil or other suitable liquid maintained at a suitable temperature usually of the order of 250° to 350° F., depending upon the nature of the article. This reheating bath relieves the surface strains in the hardened zones and eliminates or materially reduces the tendency to the formation of surface cracks. Upon removal from the conveyor 55, the shafts are cleaned of the oil, and oil hole plugs that were put in before hardening are removed and the shafts are then ground on all bearings or other surfaces requiring ground finishes.

*Connecting bus bars to tunnel focus inductors*

For the purpose of supplying heating energy to the various stations along the tunnel 41, a system of bus bars such as 56, 57 and 58, shown in the upper part of Fig. 1, is placed in substantially parallel relationship with the tunnel and these bus bars are preferably carried considerably above the tunnel for economy in space and convenience of use. These bus bars are usually supported by insulating means on a metal carrier frame 59 which may be attached to a part of the frame of the building in which the equipment is used. This carrier frame not only supports the bus bars but supports supply headers such as 60 for cooling water lines 37 and also various relays, air supply lines and other parts which are conveniently located thereon.

For conducting the high frequency current, usually employed, from the bus bars to the focus inductors, two groups of cables 61 and 62 carried in close parallel relationship to reduce harmful inductance are employed. A group of small cables instead of one large cable is usually desired to reduce heating losses caused by induction and obtain the flexibility required in moving the focus inductor along its tracks 33 and in swinging it on its trunnions 29. These two groups of cables are usually bound together in parallel relation at suitable places such as at 63, thereby substantially eliminating induction losses therein.

As it is desired to have the focus inductor connected to the bus bars only during such periods as heating is required, means for readily connecting and disconnecting terminals 64 and 65 of the cables 61 and 62 relative to the bus bars 56 and 57 is required. This connecting and disconnecting means which is shown in some detail in our copending application Serial No. 174,611 filed November 15, 1937, now Patent No. 2,261,845, dated November 4, 1941, comprises a bracket 66 supported on an insulating spacer 67 which is usually made of such material as hard rubber or micarta and which is carried between the bus bars 56 and 57. Hingedly mounted on bracket 66 are two pairs of arms 68 and 69 to the lower ends of which contactor blocks 64 and 65 are connected respectively. At the upper end of arms 68 and 69 are connected the two relatively moveable members 70 and 71 of the air operated chamber 72. Compressed air is supplied to this chamber through hose line 73 from relay operated valve 74. Air is supplied to valve 74 by supply header 75. The contactors 64 and 65 serve as terminals for the groups of cables 61 and 62. These contactors are usually rectangular blocks of copper having a series of drilled and counterbored holes for the cable ends. The insulation is removed from these cable ends and the exposed metal of the cable is inserted in the lower ends of the drilled holes as shown. The space around the exposed metal of the cable, provided by the counterboring, is filled with a fusible metal such as solder which secures each cable in good current conducting contact with the metal of the contactor. The construction and method of operation of the mechanism comprising these contactors are fully set forth in our copending application Serial No. 174,611 above referred to.

*Operating station control drum*

The control drum should be arranged to function after the station is ready to go through its heat treating cycle and at a time when heating energy is available for the station. To this end the motor driven selector shown in Figs. 4 and 5 is employed. When the inductor blocks 34 and 35 of Fig. 1 have been placed in position over the shaft or article to be hardened, a contactor button shown at 90 in the signal panel 90A which contains yellow, red and blue or lights of other appropriate colors is operated at the tunnel station to close, through a holding circuit, a switch in a circuit operating a clutch for actuating the timing drum. The selector motor 91 running continuously and through suitable gearing 92; drives disc 93 at suitable speed, which for average uses is about 60 revolutions per minute. This brings contactor 94 successively into contact with brushes 95, there being one such brush for each timer drum. The brush 96 contacts with brass ring 97 which ring is maintained in current conducting relationship with contactor 94 by means of the brass screw 98. The ring 97 is insulated from disc 93 by means of ring 99. Holders 100 for brushes 95 are carried in insulating bushings 101 in brush carrier member 102. This brush carrier ordinarily is supported on the frame of motor 91 by means of flange 103. Each of the wires such as 104 attached to brushes 95 leads to a different station along the tunnel 41 where buttons such as 90 for preliminarily closing the drum clutch control circuits are located on suitable panels. The brush 96 which is supported by an insulating bushing 105 in the bracket 106 carries wire 107 which completes the return circuit to the source of the control current at the instant the contactor 94 passes one of the brushes 95. Each of the brushes 95 corresponds to a given station and is in a circuit controlled by the push button 90 for that particular station.

The starting button 90 may be pressed and other holding circuits established at several or all of the stations at one time, but we have provided interlocking circuits which prevent the engagement of any control drum clutch at a time that would cause interference or overlapping with the functions at a station already in operation.

Two or more stations, or the heating or other periods of two or more stations, may be prevented from operating simultaneously and these stations may be brought into operation in the order in which buttons 90 are operated. If two of these buttons are operated in rapid succession or simultaneously, the stations will function in the order of the contacts made by contactor 94 with the brushes 95 in the control circuits.

Description of wiring diagram

Having now pointed out the general arrangement of the heater stations along the tunnel, the apparatus whereby heating current is supplied to the focus inductor at each station and the means whereby the control drum for each station is set in operation, we will now describe the electrical connections for operating the various parts of the mechanism as well as for the distribution of heating current, reference being had to Figs. 14a and 14b.

Figs. 14a and 14b show the wiring diagram for two stations. The operation of the station indicated as No. 1 will now be pointed out by reference to this diagram, the operation of station No. 2 being substantially the same in every respect as that of station No. 1.

The control circuits are supplied with current through lines L1 and L2 and are connectable to suitable supply lines by an ordinary switch S, as shown. The timing drum motor M1 and selector motor M2, the functions of which are hereinafter explained, are connected across lines L1 and L2 and normally are both started upon closing switch S and ordinarily run continuously.

Inducing current for heating the shaft or other articles is supplied by the generator 110 which delivers this current to the primary coils 111 of a transformer, there being a transformer for each heat treating station as indicated. The generator may be driven from any suitable source but is preferably driven by direct connected synchronous motor which runs continuously and the power is applied at the different heat treating stations when and as required. It will be understood that a large number of stations may be operated from the same generator or from a group of generators by connecting more stations in a manner similar to the connections shown for stations 1 and 2. After provision has been made for a number of stations, any one or more may be omitted in the successive operations of the device by leaving open the switches connecting the control circuit of that particular station, such for instance as switches 112 and 113, hereinafter described, if station 1 were to remain inoperative.

Exciter 110a supplies current to field 154 of generator 110. A shunt 110b controlled by switch 110c is provided as means for shorting out this field to rapidly reduce to a preselected minimum the output of generator 110. Switches 111a and 111b are provided in the field circuit to open this circuit entirely and bring the output of generator substantially to zero. The output of exciter 110a is regulated manually by rheostat 112a.

Proceeding now with the operating steps as applied to station No. 1, the high frequency generator 110 having been started the timing drum motor M1 and selector motor M2 are started by closing switch S. To operate station No. 1 switches 112 and 113, which are shown open, are closed. These switches are connected as indicated by the broken lines so that both open or close substantially at the same time. Fuses are provided at 114 and 115 as a protection for the apparatus supplied by current from these switches. As long as station No. 1 is intermittently operated either alone or successively with one or more other stations, these switches remain closed. They are opened only when this station is to remain inoperative while other stations are being used. In general, the operating procedure is as follows:

The necessary motors are put in operation; the station cutout switches 112 and 113 are closed; the shaft or article 116 to be surface hardened is placed in proper relation to the inductor circuit formed by the members 34 and 35; the push button starting switch 90, which is shown in Fig. 1, is closed so as to start the apparatus of station #1. Closing the starting switch 90 permits the operating circuit current to actuate various relays for controlling the timing mechanism of the heating and quenching cycles as hereinafter explained.

Upon closing the starting switch 90, the circuit is completed so that current may progress from line L2 through the switch 113 through the fuse 115 through line 22L through the normally closed drum contact 125 on station #1 control drum #124, through the line 27L, through the normally closed switch 123, through the normally closed stop switch 122, through the starting switch 90, through the coil of relay 126, through the fuse 114, through switch #112 back to L1 the other side of the supply line. A green light 121a is connected in parallel across the terminals of the coil of relay 126 and this remains lighted as long as the relay is energized, and serves to indicate that circuit is in operation.

Upon a momentary contact of starting button 90, relay 126 is thus energized and through a mechanical connection this relay simultaneously closes contacts 127 and 128. The switch 127 maintains a holding circuit through relay 126 for keeping switch 128 closed.

The switch 127 is connected across the terminals of starting switch 90 so that after the relay 126 has been energized through the operation of the starting switch 90, a holding circuit is established whereby the relay 126 continues to be energized even after the opening of switch 90 and relay 126 remains energized until its circuit is broken by the rotation of the drum 124 or by the pressing of the stop switch 122, the operation of which is hereinafter described.

When the switch S is closed to connect the lines L1 and L2 to the control circuits, relay 129 is energized and its circuit may be traced as follows: Starting from L1 through relay coil 129, through line L11, through normally closed contact 137 (on relay 135) through line A5, through normally closed contact 138 on relay 135' through line A25, through normally closed contact 139 on station #1 bus bar contactor switch, through line A26, through normally closed contact 140 on station #2 bus bar contactor interlock to line L2. Contact 130, mechanically connected to relay 129, is closed thereby and remains closed until one of the stations is put into operation. With contact 130 closed a line circuit is established from the L11 terminal of relay coil 129 to the rotating control member 131 on the station selector. As the contact member 131 moves continuously, it makes successive contacts at points 132, 133, 134, etc., on the selector dial. When the contact member 131 reaches point 133 the circuit for No. 1 station is completed, switch 129 having been previously closed as above pointed out.

Starting at switch S, current then flows from line L1 through closed contact 113 through fuse 114, line 21L through relays 135 and 136 which are connected in parallel; then through line L29, contact 129, contact point 133, contact member 131, contact 130 then through normally closed contacts 137 and 138 connected by line A5, thence through line A25 through the normally closed contact 139, through line A26, through normally closed contact 140 and then to line L2, completing the circuit. Relays 135 and 136 are thus simultaneously energized. Relay 136 opens contacts 137 and 142 and closes contacts 143, 144 and 145 and 146. Relay 136 closes contacts 147, 148, 149, 150 and 152. Relay 135 once closed has a self-holding circuit completed through contact 143 and drum contact 125, and it holds contacts 143, 144, 145 and 146 closed after the current which first energized it has been interrupted by the passage of contact arm 131 beyond contact point 133 and/or the opening of any of contacts 137, 139, or 138.

The action of relay 135 in opening contact 142 removes resistance 153 from the field of generator 110 to raise the current in this field, the resistance 153 having been adjusted manually beforehand to provide for normal no-load operation. In opening contact 162, contact 155 is closed bringing rheostat 153a into the generator field circuit in place of resistance 153, this rheostat having been adjusted in advance to produce the desired minimum generator operating voltage for the particular part being heated. This operating voltage is further regulated during heating by adjustable members attached to drum 124 as will be explained more fully hereinafter. The closing of contact 145 energizes the solenoid 156 which causes clutch 166 to engage and start rotating the drum 124.

Contact 144, in closing, supplies current through line L31 to the solenoid 157, controlling the air operated bus bar contactors 159 and 161, thereby closing these contactors. Contact 144 also supplies current to actuate relay 158 which closes contactor 160. The primary 111 of the focus indicator is thus connected to the bus bars 162 and 163 of the generator 110 and to the third bus bar 164.

Contacts 175 and 139 are mechanically connected to bus bar contactors 159 and 161 and they are arranged so that contact 139 opens and contact 175 closes the instant these bus bar contactors engage the bus bars. With contact 139 open, all other stations are locked out against operation until these particular bus bar contactors again open. Contact 175 is in the circuit with the relay 176 that operates the main circuit breakers so that contact 175 must be closed before the main circuit breaker contacts 180 and 181 may be closed. Therefore, the bus bar contactors must be closed before the main circuit breakers 180–181 can be closed.

The contact 143 in closing establishes a holding circuit for relay 135, as previously explained.

The operation of relay 136 in closing contact 152 supplies current to line K17 of the circuit controlled by drum 124 for regulating resistance in the field circuit of generator 110. This is accomplished as follows: Contact 142 being opened by relay 135 simultaneously with the closing of contact 152 by relay 136, current in line K18 is interrupted and the entire output of exciter 110a is delivered thru ammeter A and resistances 187a, 187b, etc., all of which resistances normally are in series with the generator field station rheostat 188A. As the temperature rises in article 110 being heated, the resistance in the circuit increases and higher out-put voltage from generator 110 is required. This higher voltage is accomplished by reducing resistance in the armature circuit of exciter 110a thus increasing its current output to the field 154 of generator 110. As drum 124 rotates, clips 182a, adjustably attached to the drum close contacts 183a, thereby supplying current from line K17 to relays 184a. This last named relay closes holding contact 185a and also contact 186a, contact 185a completing a circuit to hold contact 185a closed. Contact 186a being closed, shorts out the resistance section 187a. Similarly, clips 182b, 182c, etc., actuate corresponding relays and contacts, thereby cutting out other resistance sections 187b, 187c, etc. By setting the clips at proper position on the drum the current in the generator field is controlled so as to provide the desired voltage at all times during the heating cycle, hence controlling the heating power applied at the heating station during the heating interval at all stages. Hand operated switches 188a, 188b, etc., serve as means for shorting out such of resistances 187a, 187b, etc. as may not be needed for certain classes of work at the heating station. For heating another article requiring more or less power from generator 110, rheostat 188A is usually adjusted and contacts 182a, 182b, etc. are rearranged on the drum 124 to cut out more or less of resistance 187a, 187b, etc., and to cut these out at times as changes in power output are required.

Since the inductance of the circuits differ with different articles being heated, and since it is necessary to maintain a power factor as near unity as possible for efficient heating, provision is made for introducing into the circuits condensers of such capacity as will provide the most favorable operation. The condensers provided for this purpose are indicated at 165, 166, 167, 168 and 169. Condenser 169, which corresponds to the minimum capacity required for any station, that may be placed in operation, is permanently connected across bus bars 162 and 164. The total amount of capacity required is determined by calculation or by a preliminary test on a sample piece of material corresponding in size and analysis with the article to be heated. With this determination made such of switches 170, 171 etc. as control the amount of capacity required are closed so as to make these condensers available in the circuit when required. Contacts such as 147, 148, 149 and 150 which are closed by relay 136 supply current to lines L16, L17, L18 and L19 for relays 165a, 166a, 167a and 168a controlling the condensers 165, 166, etc. Since only certain ones of switches 170, 171 etc. have been closed only such condensers as correspond to these closed switches are connected to the heating circuit regardless of the fact that all of contacts 147, 148, 149 and 150 are closed by relay 136. Thus switches 170, 171 and 172 may be closed to make condensers 165, 166, and 167 available for heating station No. 1 while switches 171', 172' and 173' are closed to make condensers 166, 167 and 168 available for heating station No. 2. Condensers 166, 167 and 169 are thus common to both heating stations while the other condensers are not.

There should be no direct contact between the shaft and the inductor parts 117 and 118 during application of heating current. If, before the start of the heating cycle the shaft happens to be in contact with the heating inductor, relay 174 will be energized by current from transformer 174a flowing thru a circuit completed by the inductor 35 being grounded on shaft 116, thereby opening contact 123, making it impossible for the operator to complete the circuit to start the cycle of operations until after he has cleared the contact between the shaft and the inductor. In such case the relay 174 not only opens the operating circuit but closes a circuit through a signal lamp Y or a bell.

Upon closing the heating circuits, the circuit through the red lamp R is closed and remains closed during the heating interval indicating that heating is in process at station No. 1.

With relays 135 and 136 energized and the switches operated by them in corresponding positions, and with drum 124 set in rotation by the engagement of clutch 156, the successive steps in the cycle take place. Heating is started by cam contactor 189 on drum 124 closing contact 190. The current passes through the normally closed contact 191 and relay 192, the latter bringing contact 193 into closed position, thus completing the circuit through interlock contact 175, mechanically held closed by bus bar contactors 159 and 161. Closing contact 175 opens contact 139 thus preventing any energizing current from reaching relays operating any other station, and preventing two stations from being simultaneously connected. The interlock contact 175 supplies current to relay 176 which closes contact 177 energizing solenoids 178 and 179 and these two solenoids close main line contactors 180 and 181.

As drum 124 continues to rotate, heating cam 189 holds contact 190 in closed position until, at the end of heating, cam 189 has passed contact 190 at which instant this contact opens, de-energizing relay 192. This opens contact 193 which in turn de-energizes relay 176, thereby opening contact 177. Opening of this latter contact de-energizes relays 178 and 179, thereby causing the main circuit breakers 180 and 181 to open and to disconnect the supply of high frequency current from the circuit.

Substantially simultaneously with the opening of circuit breakers 180 and 181 at the end of the heating period, clip 194 on drum 124 momentarily closes contact 195, establishing a circuit to energize relay 196, closing a normally open holding circuit contact for relay 196 and opening a manually closed contact 196b. The opening of 196b inserts resistance 196c in the generator field circuit. Immediately thereafter clip 194' on the drum momentarily closes contact 195' energizing relay 196' thereby opening contact 197 which in turn opens the holding circuit for relays 184a, 184b, etc., de-energizing these relays and opening contacts 186a, 186b, etc., so that resistances 187a, 187b, etc. are again inserted in series with the generator field. When contact 197 opens, relay 196, is also de-energized so that contact 196b closes and short circuits resistance 196c. The field resistance of the generator is thus reset for the proper value for starting another heating cycle for the same or another heating station.

During the heating period quench cam 199 closes contact 200 supplying current to the relay 203 which operates bypass valve 201 in the quench supply line sufficiently in advance of the end of the heating period to permit pressure to build up at the valve 202 at the station 1, and this relay holds the bypass valve closed until shortly after the quenching is completed, thereby insuring sufficient quenching pressure during the quenching period.

Contact 125 which is closed by engagement of cam 207 at the beginning of the station cycle remains closed, usually until after the termination of the heating period, at which time the end of cam 207 having been reached, contact 125 opens and remains open until near the end of the revolution of the drum, at which time the first end of cam 207 again engages and closes contact 125.

When contact 125 opens, it opens the holding circuits to relays 126, 135 and 136, and de-energizes these relays so that all the contacts they control return to their normal positions.

With relay 126 de-energized, holding contact 127 (which is in series with contact 125) for relay 126 opens; at the same time contact 128 opens and this prevents the station from repeating the cycle of operations until the contact 129 for this starting station is again closed.

With relay 135 de-energized, holding contact 143 (which is in series with 125) for both relays 135 and 136 opens; at the same time contact 137 is closed.

When relay 136 opens the normally open contacts 147, 148, 149 and 150 open, thereby disconnecting the corresponding capacitor units from the bus bars 162 and 164. At the same time contact 152, also mechanically connected to relay 136, opens, cutting off the supply of current to line K17, the line that supplies current to actuate relays 183a, 183b, etc.

When relay 135 is de-energized, contact 144 is opened, and with the opening of this contact the solenoids 157 and 158 are both simultaneously de-energized. With solenoid 157 de-energized, the air pressure is released from the bus bar contactor diaphragm, thereby permitting the spring actuated bus bar contactors 159 and 161 to open and to disconnect the bus bars 162 and 164 from heating station No. 1. When solenoid 158 is de-energized, which occurs as above described, contact 160 opens, thereby disconnecting conductor 163 from station No. 1.

When the bus bar contacts 159 and 161 open, interlock contact 139 closes and interlock contact 175 opens.

With the opening of contact 125 by the rotation of drum 124 as above described, the different control contacts are all restored to position so that the heating cycle at another station, such as station No. 2 may be started and carried through exactly in the same way as described above for station No. 1.

In the meantime drum 124 continues its revolution and substantially at the end of the heating period, but usually a fraction of a second after, it is terminated by the opening of switch 190, quench cam 204 closes contact 205, and through line L36 (with the blue light B in parallel) energizes relay 206 which opens valve 202, thereby supplying quenching fluid under pressure to the hollow inductors 34 and 35, and through openings from them onto the heated areas. This quenching continues as long as cam 204 maintains contact 205 in closed position. The quenching period is therefore determined by the length of the cam 204.

In some cases it is desirable to control the timing and the length of time of the heating period and/or the quenching period to close limits such as 1/10 second, or even closer, and to insure satisfactory results it is sometimes preferable to use a synchronous motor to drive the timing drum mechanism.

Drum 124 driven by motor M continues to rotate until it has completed one full revolution at which time roller 234, shown in Figs. 14 and 15, enters the slot in the clutch member 228, locking the drum in a definite starting position ready for beginning another cycle as will be hereinafter explained. Just before reaching the end of its rotation, cam 207 operates to close switch 125 so that the circuit of line L27 is closed and is ready to function again for station No. 1 in the next cycle of operations. This cycle of operations cannot again start until push button 120 is once more operated.

In event it is desired to stop operations at a station such as station No. 1 at any time in either the preparatory or heating period, stop switch 123 is operated. It opens the circuits of line L28 which de-energizes relay 126 and prevents the station from being picked up by the selector 131. In event contact has already been made by the selector so that drum 124 has been set in motion, pushing button 122 closes the circuits of lines L33 and L34 which energizes relay 208.

When relay 208 is energized, it is held in that condition through the holding circuit closed by contact 209, this contact being in series with the drum contact 190. At the same time when relay 208 is energized, it opens contact 191 and this in turn de-energizes relay 192 so that contact 193 opens and interrupts lines S17 and L2, this releasing relay 176. This de-energizes relays 178 and 179, thereby causing main line contactors 180 and 181 to open and to interrupt the heating, at the instant at which such opening occurs. The drum 120—124, however, continues to rotate until it has completed its movement to the predetermined stopping point.

As previously pointed out the holding contact 209 for relay 208 is in series with the drum contact 190, so that relay 208 is kept energized until drum contact 190 opens and the main line circuit breakers are thereby prevented from closing again until the drum contact 190 opens.

*Description of control drum*

The control drum 124, its driving mechanism and related parts together with the construction of the contacts operated by this drum as indicated in Figs. 14a and 14b will now be described, reference being had particularly to Figs. 6–13 inclusive.

Before the mechanism is put into operation, a drum such as 124, fitted with suitably adjusted clips such as 182a, 182b, and 184 and with suitably formed and located cams for controlling the heating and quenching such as 199, 204 and 207, is inserted for each station it is desired to operate. The form and location of each clip and cam are determined beforehand by experiment if sufficient experimental or other data are not already available to determine them by calculation.

After a drum has once been equipped with the clips and cams properly set for a particular journal or other surface, it is usually preserved without change of setting after being removed from the apparatus, especially when it is expected that another article of the same size and analysis is to be hardened at a later date. However, the clips and cams may be readily relocated on the drum or may be replaced by other clips or cams and thus the same drum with the changed timing elements serves for timing the heating and quenching functions of another journal or article.

Referring particularly to Figs. 6 and 7, the drum 124 is carried between two coaxial discs 210 and 211 each of which has a peripherally extending bead such as 212 engaging the inner circumference of the drum to maintain the drum in concentric relationship with the discs. The disc 210 at the upper end of the drum is carried by shaft 213 which is rotatably mounted in supporting bracket 214. This supporting bracket is carried by a base 215 usually in the form of a steel plate. Shaft 213 is mounted retractably in the bracket 214, the spring 216 engaging a thrust bearing 217 on the shaft at its one end and the replaceable cap 218 at its other end. The spring exerts sufficient axial pressure on bearing 217 to maintain bead 212 in engagement with the drum and prevent any looseness or lash in its operation. The handle or knob 219 serves as means for withdrawing the shaft sufficiently to disengage the bead 212 from the drum when it is desired to replace this drum with another having clips and cams set for a different timing. The spring actuated plunger 220 engages the notch 221 cut in the shaft 213 to hold the shaft in retracted position while the drum is being removed or replaced.

At the lower end of the drum the disc 211 is provided with a driving lug 222 engaging a notch in the drum as shown more clearly in Fig. 16 to insure a positive drive for this drum. The disc 211 is rotatably carried on shaft 223 which is pinned to bevel gear 224, the latter being driven by gear 225 carried by continuously rotating shaft 226, the latter shaft being driven by motor M indicated on Figs. 14a and 14b. The member 227, referring to Figs. 6 and 7, which is substantially in the form of a spur gear is keyed to shaft 223 and serves as a clutch driving member. The clutch driven member 228 which is provided with one or more pins 227' disposed to engage between the teeth in member 227, is slidable on shaft 223 to effect the engagement and disengagement of the pin or pins with the teeth. A driving arm 229 is secured to the hub of disc 228, and at its outer end slidably engages pin 230. This pin is secured in drum disc 211 and serves as a means by which driven member 228 is slidably connected to this drum disc but in such manner that 228 must always rotate with 211. The pin 230 is of sufficient length to always engage the end of arm 229. The yoke 231 engaging a thrust face on the hub of driven member 228 serves as means for sliding this member axially to engage the aforesaid pins with the teeth of member 227. This yoke, which is hingedly mounted at 232 on bracket 233 secured to base 215, is actuated by solenoid 155 also indicated on Fig. 17. This solenoid when energized by current supplied through the connections of the selector, after starting switch 120 shown on Figs. 14a and 14b has been closed, exerts a pulling force on the yoke 231 and thereby brings members 227 and 228 into clutching engagement which starts drum 124.

The solenoid 155 is energized for only a short period or until the driven member 228 has rotated enough to bring the edge of the notch in the face of this driven disc past roller 234 as shown at an enlarged scale in Figs. 11 and 12. This roller being supported by boss 235 attached to plate 215, bears against the upper face of driven member 228 and thus holds the clutch members in engagement until one full revolution has been completed, when the driven member 228 is shifted back by spring 236, and the roller drops into the notch bringing the driven member and disc 211 to rest with the drum 124 in its initial position, at which time the cycle of heating and quenching is completed. In some cases it is desirable to control the functions for more than one cycle by a single revolution of the drum and this is accomplished by providing one or more additional notches in the rim of the disc 228 for the engagement of roller 234 and making necessary changes in the control to correspond with the additional notches.

The means whereby the rotation of drum 124 establishes the various contacts for actuating the relays and other members in the control circuits as indicated in Figs. 14a and 14b are shown in Figs. 7, 8, 9 and 10. The heating and quenching cams such as 207 engage rollers such as 237 making the silver button soldered to the roller carriers 238 contact with the silver tipped adjustable screw contacts 239. The current is supplied by a common connection 240 and is distributed by individual lines such as 241 leading to the various heat and quench operating relays that are illustrated diagrammatically in Figs. 14a and 14b.

For the generator field regulation the adjustable clips 182a, 182b, etc., and 194 engage the projections 242 formed by a bend made in the central parts of reeds 243 (see Fig. 10). These reeds through insulating buttons 244, deflect current conducting reeds 245 establishing contact between silver buttons 246 and adjustable contact screws 247 thus supplying current from the common connections 248 to lines 249 leading to the various relays 184a, 184b, etc. which control the resistances in the field circuit of the generator.

In many cases it is desirable to subject a piece that is to be zone hardened to a pre-heating treatment at the location that is to be hardened before hardening by heating and quenching. This pre-heating treatment is often desirable for certain pieces regardless of whether the material is ordinary carbon steel or one of a wide variety of steel alloys. The procedure in such cases is to heat the region in which the zone to be hardened is located to a temperature approximately 400 to 500 degrees Fah. below the critical temperature. Immediately after this heating, the zone to be hardened is heated and quenched by the method elsewhere described in this specification.

Under certain conditions we accomplish the timing of the heating and quenching by means other than that of the drum above described.

Depending upon various conditions, we use as such other control means than the drum, one of the following described time measuring devices:

1. A contact making or contact breaking plunger arranged to function by spring or other resilient means or by gravity action with an adjustable metered fluid control to time the travel of the plunger, and with an automatic thermostatic valve mechanism to control the fluid opening so as to compensate for changes in viscosity of the fluid due to temperature changes.

2. A thermo electric timing device consisting of a leaf member held by one end so as to be adjustable as to tension, the leaf being made from two metals having different coefficients of expansion and an electric heating coil for the leaf arranged so that when current is connected to the coil the heating developed will after a predetermined time cause the leaf to bend and make or break contact with an adjustable contact piece thereby closing a circuit to actuate a solenoid operated switch or valve, whichever may be needed.

3. A gravity, spring or motor driven clock mechanism arranged to make or break an electric contact after a predetermined time interval and adjustable means to vary the time interval. We have shown such a timing mechanism in our copending application, Serial No. 56,870. All such timing devices are readily set by a single movement by the operator. For instance, when the operator pushes the starting button at his station all the timed circuits being operable by the button are set for timing action. One of these circuits starts the heating immediately or after a very short preliminary interval. Another terminates the heating at the proper time. Another starts the quench at or near the end of the heating period, and another one interrupts the quench.

Regardless of the type of timing device employed, we provide contacts associated with such timing device for connecting or disconnecting an electric circuit after a predetermined time and these contacts are properly inserted in the control circuits to correctly time the various heat treating intervals.

Of course, when several stations are being operated, it is usually found necessary to avoid having two of these connected to the heating current source simultaneously. A selector device similar to that herein described will thus be required regardless of whether a timing drum or one of the alternative timing mechanisms described herein is used.

For some purposes we control the timing of the heating interval and the timing of the application of the quench by a relay or relays actuated by a thermo-couple or a color sensitive optical device set adjacent to the surface of the article being heated. We have shown such apparatus in our Patent No. 2,180,038 issued November 14, 1939.

While in general this specification makes reference to the heating of one part of an article at a time, we do, when necessary or desirable, heat treat two or more separate zones on one article at one time, or separate zones on separate articles at the same time; and further, we accomplish this in cases where the separate zones require different amounts of heating power or different heating periods, or both. For instance, if it is desired to heat treat two or more separate zones on the same or separate articles that require the same heating power, we connect the two heating inductors to the same high frequency source either in series or in parallel. If such separate zones require different amounts of power or different heating periods we control the delivery of the correct amount of power to each zone and the time of application of the heating at each zone according to the needs of the work by a judicious application and/or combination of the devices we have referred to, shown or described herein.

It will be seen from the foregoing description that we have provided wholly automatic mechanism for acting on materials subject to heat treatment and that our invention reduces to a minimum the manual operations required and at the same time accomplishes the objects above set out.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. An apparatus for hardening an article in particular portions thereof by electro-magnetic inductive heating and quenching, comprising a source of alternating current, bus bars connected to said source, a plurality of stations at each of which a portion of an article is adapted to be hardened, a conveyor on which an article may be moved from one station to another, said bus bars extending from one station to another, a heating circuit for each station, the heating circuit comprising an inductor adapted to lie in closely spaced relation with one of the portions and means for connecting the inductor to the bus bars, means for approximately tuning the heating circuit at said station independently of the tuning at another station, said tuning means including variable condenser means, means for starting operation of each station, means responsive to the starting of each station for automatically controlling said variable condenser means to provide a different condenser effect at said station than at another of the stations, and lock-out means at each station to prevent two inductors from being connected to the bus bars simultaneously, the lock-out means at one station being operable by current flowing in a circuit at another station.

2. In apparatus for hardening articles by electro-magnetic inductive heating followed by quenching, a plurality of stations at each of which an article is adapted to be hardened, a source of periodically varying current for all of the stations, means at each station for heating a selected part of the article by electro-magnetic induction, timer controlled mechanism at each station for measuring a duration of heating at that station, capacity control means for changing the power factor of said periodically varying current, the capacity control means comprising preselecting switches for preliminarily closing a selected part of a capacity control circuit to make a selected capacity available for a heating circuit at a selected heating station while leaving some of the switches open to exclude other capacity from the said heating circuit, and timer controlled means for completing the selected part of the capacity control circuit to connect the selected capacity to the selected heating circuit for a predetermined interval.

3. An apparatus for hardening portions of an article by electro-magnetic inductive heating followed by quenching, which apparatus includes a plurality of stations at each of which an article is adapted to have at least some portion of it hardened, means at each station for inductively heating the article to be hardened at that station, a source of alternating current for the heating means, condenser means for raising the power factor of the current at the station being operated, said condenser means including a plurality of condensers of different capacities, a switch for each condenser, relays for each station for automatically closing certain of said condenser switches in the alternating current circuit adapted to connect condensers to a circuit at said heating means, a plurality of manually controlled switches for each station to increase capacity in the circuit at that station substantially in proportion to an increase in reactance of the said circuit due to a rise in temperature of the portion of the article being heated at the said station, means for actuating the heating means at each station, the condensers and relays energized at a station being actuated in response to the actuating means at such station, and lock-out means at each station to prevent two inductors from being connected to the alternating current source simultaneously, the lock-out means at one station being operable by current flowing in a circuit at another station.

4. An apparatus for hardening predetermined portions of an article, said apparatus comprising a plurality of stations at each of which a part of the article is heated electro-magnetically by current supplied to an inductor, the heating being followed by quenching, a conveyor by means of which the article may be moved from one station to another, the inductor at each station being adapted to heat some portion of the article, a timer at each station for timing the duration of heating at that station, the timer at one station having adjustable contactors substantially corresponding with contactors of a timer at another station, means for adjusting the contactors on the timer at the one station to change the duration of heating at that station relative to the duration of heating at he said another station, means for controlling voltage of the current applied to the inductor at each station, said means including an adjustable timer contactor in a voltage control circuit, means for controlling phase relation of the current applied to the inductor at each station, the said last named means including a timer contactor in a capacity control circuit, all of the control circuits being commonly connectable to a common circuit by contactors on all the timers, and a source for supplying periodically varying current to the inductors.

5. An apparatus for heating two articles by electro-magnetic induction comprising two conductors for heating the two articles, a generator for supplying alternating current to said conductors, a field circuit for said generator, switches in the said field circuit, timer operated means for actuating said switches in timed relation to control a plurality of resistances to increase current in the generator field circuit, timer operated means for closing a switch for successively connecting the generator to the conductors and for simultaneously and differently actuating the means for increasing the field current of the generator whereby generator voltage is increased simultaneously with application of the heating means, the said increase being at a different rate for one of the articles than for the other article.

6. An apparatus for heating two articles by electro-magnetic induction comprising inductors for heating the articles, two timers for controlling the heating within different limits for the two articles, means whereby operations of both of said timers may be substantially simultaneously initiated, a high frequency generator source of periodically varying current for said inductors, and automatic means for changing voltage of the said source of current for one of the articles independently of a change of voltage for the other article, said automatic means comprising means for varying current in an excitation circuit of the high frequency generator, said last named means comprising one or more contactor elements on each of the said timers.

7. In apparatus for hardening articles by electro-magnetic inductive heating and quenching, comprising a plurality of stations at each of which an article is adapted to be heated, each station comprising a heating conductor adapted to lie in spaced relationship with an article to heat the article, a high frequency generator for delivering heating current to all of the stations, bus bars being connected to the generator, the bus bars extending from one station to another, means to connect a heating conductor at each heating station to the bus bars successively to heat the articles one at a time, the generator having a field circuit, time controlled means for progressively changing current in the field circuit to increase voltage at the aforesaid bus bars during a heating interval, timed means for automatically reducing the field current of the generator to terminate the heating interval, switch means in timed relation with the reducing means to disconnect the generator from the bus bars after said field current has been reduced, a group of pre-selected condensers connectable to the heating circuit, and means to automatically connect and disconnect said condensers in the heating circuit in timed relation with the beginning of the heating interval, the condensers at one heating station being of a different capacity than the condensers at another station.

8. In apparatus of the class described, a source of high frequency current, a first inductor adapted to heat one article, a second inductor adapted to heat another article, a first circuit comprising switching means for connecting the first inductor to the source, a second circuit for connecting the second inductor to the source, voltage control means for the high frequency current, said control means comprising a series of resistance units, a first switching means for shorting out a first group of selected resistance units in timed relation to delivering current to the first inductor to increase current being delivered to said first inductor, a second switching means for shorting out a second group of selected resistance units in preselected timed relation to delivering current to the second inductor to increase current being delivered to the second inductor, each switching means comprising an independent member to selectively operate current contacts to short out preselected resistance units, a part of the resistance units being common to both groups, timing means for connecting the resistance units of the first group to the first circuit in timed relation with connecting power to the first inductor, timing means for connecting the resistance units of the second group to the second circuit in timed relation with connecting power to the second inductor, and automatic means to prevent connecting resistance units of the second group to the second circuit while resistance units of the first group are connected to the first circuit.

9. In apparatus of the class described, a source of high frequency current, a first inductor adapted to heat one article, a second inductor adapted to heat another article, a first circuit comprising switching means for connecting the first inductor to the source, a second circuit comprising switching means for connecting the second inductor to the source, power factor control means comprising a bank of condensers, switching means for connecting selected units comprising a first group of condensers to the first circuit, switching means for connecting a second group of condensers to the second circuit, a part of the condensers being common to both groups, timing means for connecting the condensers of the first group to the first circuit in timed relation with connecting power to the first inductor, timing means for connecting the condensers of the second group to the second circuit in timed relation with connecting power to the second inductor, and automatic cut-out means to prevent connecting condensers of the second group to the second circuit while condensers of the first group are connected to the first circuit.

10. In apparatus for independently heating two metallic articles by electro-magnetic means, a first station comprising a first inductor adapted to heat one of the articles, a second station comprising a second inductor adapted to heat the other article, means operable during heating by the first inductor to initiate heating by the second inductor, means to automatically cause a beginning of heating by the second inductor immediately after heating by the first inductor has terminated, and means common to both the aforesaid stations for selectively regulating power being delivered to both inductors to heat the article at the second station at a different rate than the article at the first station is heated, and means to independently and automatically regulate current and voltage phase relationship at both of said stations.

11. In apparatus of the class described for heat treating an article, a first inductor adapted to lie in current inducing relation with a part of the article, a second inductor adapted to lie in current inducing relation with another part, a source of current for the inductors, timer means including a first timer for initiating heating by the first inductor, means controlled by the first timer for progressively varying a rate of power being delivered to the first inductor during a heating interval to control a rate of heating in the article, the timer comprising means for providing a predetermined phase relationship of the current and voltage of the power being delivered to the first inductor during the heating interval, a second timer to control power to be delivered to the second inductor, and means to prevent operation of the second timer while the first timer is in operation, the said last named means comprising a switch in a circuit of the first timer.

12. In apparatus of the class described for successively heating articles, two heating stations, a heating conductor at each station adapted to heat an article at that station, a power circuit for supplying current to each of said conductors, a control circuit at each station for regulating heating at said each station, a relay associated with each of said control circuits for closing a part of each of the control circuits, a manually operable switch at each station for supplying current to the relay at that station, a selector adapted to momentarily close the said control circuits consecutively, relay means in a circuit of the selector to hold one of said control circuits closed which has been closed first, said last named control circuit comprising means for closing a switch in the power supply circuit, a condenser for tuning the power supply circuit, a timer, switch means in the first closed control circuit for starting the timer, and a variable resistance for changing voltage in the power supply circuit, the said timer comprising means for timing a change in the variable resistance.

FRANCIS S. DENNEEN.
WILLIAM C. DUNN.